US010286938B1

(12) United States Patent
Ramey

(10) Patent No.: US 10,286,938 B1
(45) Date of Patent: May 14, 2019

(54) BACKPACK CART

(71) Applicant: Paul Ramey, Post Falls, ID (US)

(72) Inventor: Paul Ramey, Post Falls, ID (US)

( * ) Notice: Subject to any disclaimer, the term of this patent is extended or adjusted under 35 U.S.C. 154(b) by 0 days.

(21) Appl. No.: 16/138,179

(22) Filed: Sep. 21, 2018

(51) Int. Cl.
| A45F 3/08 | (2006.01) |
| B62B 1/12 | (2006.01) |
| B62B 1/26 | (2006.01) |
| B62B 5/06 | (2006.01) |
| B62B 1/14 | (2006.01) |

(52) U.S. Cl.
CPC .............. B62B 1/12 (2013.01); B62B 1/14 (2013.01); B62B 1/26 (2013.01); B62B 5/067 (2013.01); B62B 2202/24 (2013.01); B62B 2205/12 (2013.01)

(58) Field of Classification Search
CPC ..... A45F 3/08; A45F 3/10; B62B 5/00; B62B 1/00
See application file for complete search history.

(56) References Cited

U.S. PATENT DOCUMENTS

| 8,641,056 B1* | 2/2014 | Carter ...................... A45F 3/10 280/30 |
| 2007/0075105 A1* | 4/2007 | Petrin ..................... A45C 5/146 224/153 |
| 2012/0067932 A1* | 3/2012 | Tayar ................... A45C 13/385 224/261 |
| 2013/0228602 A1* | 9/2013 | Thiruppathi .............. A45F 3/08 224/625 |
| 2015/0251680 A1* | 9/2015 | Carter ................... B62B 5/0023 280/30 |

* cited by examiner

Primary Examiner — James A Shriver, II
Assistant Examiner — James J Triggs

(57) ABSTRACT

A backpack cart that can be used on rugged terrain and can hold a variety of sizes of backpacks. The cart includes a pair of wheels, a central post, a horizontal support member, a lower strap holding member, an upper strap holding member, a handle member, a pack support plate and a lower support post. The horizontal support member terminates on each side in a wheel retaining shaft holding large pneumatic wheels. The central post is attached to the horizontal support member. The pack support plate is attached the horizontal support holder. The upper and lower strap holding members are attached to the central post. The handle is attached to the top of the central post facing in the opposite direction of the pack support plate. The lower support post is attached to the pack support plate and in a downward orientation allowing its lower tip to touch the ground.

7 Claims, 6 Drawing Sheets

BACKPACK CART

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of rolling carts and more specifically to a backpack cart.

Backpacks are usually defined as flexible satchels, capable of holding a variety of items, that are held on a user's back via shoulder straps. There are occasions where it is helpful to carry the backpack by other means, such as rolling it on a two wheeled cart.

Rolling luggage, having wheels at the bottom surface, is well known around the world. Equally well known is the use of rolling carts such as a "dolly" type device that is used to wheel bulky or heavy items via a wheeled metal hand truck. Such devices could be used to roll a backpack if one were to choose to do so.

However, there are deficiencies to using a standard hand truck to transport a backpack. First, it is necessary to have a secondary strap to hold the backpack in place so that it does not slide off of the dolly. Second most dollies do not have large diameter wheels, and a high-profile support plate to allow the dolly to roll over rough terrain. Third, hand trucks are not height adjustable to accommodate people of different sizes and heights.

BRIEF SUMMARY OF THE INVENTION

The primary object of the invention is to provide a backpack cart that is specifically designed to retain a backpack by being held by the pack straps and supported by pack bottom platform.

Another object of the invention is to provide a backpack cart that is designed to allow the user to travel over rugged terrain.

Another object of the invention is to provide a backpack cart that is self-standing when not in use.

A further object of the invention is to provide a backpack cart that has adjustable members for accommodating backpack size and the size of the user.

Another object of the invention is to provide a backpack cart that can be quickly disassembled and stored in a compact flat condition.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a backpack cart comprising: a pair of wheels, a central post, a horizontal support member, a lower strap holding member, an upper strap holding member, a handle member, a pack support plate, a lower support post, said horizontal support member terminating on each side in a wheel retaining shaft, said wheels each attached to said wheel retaining shafts, said central post attached centrally to said horizontal support member, said pack support plate attached perpendicularly to the upper edge of said horizontal support holder, said lower strap holding member centrally and perpendicularly attached to the lower portion of said central post, said upper strap holding member centrally and perpendicularly attached to the upper portion of said central post, said handle member perpendicularly attached to the top of said central post facing in the opposite direction of said pack support plate, said lower support post centrally and perpendicularly attached to the edge of said pack support plate and in a downward orientation allowing its lower tip to touch the ground when the backpack cart is in a rest position, and said upper and lower strap holding members capable of retaining the straps of a standard backpack and said pack support plate capable of supporting the weight of a backpack enabling a user to guide said backpack cart in a rolling manner while walking on a wide variety of terrains.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE DRAWINGS AND PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
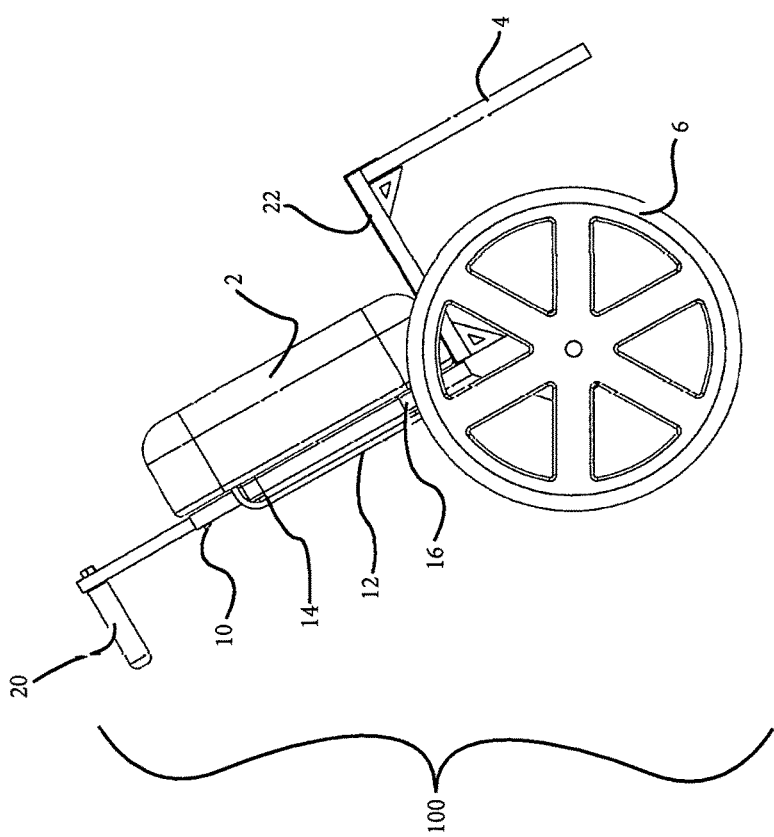
FIG. 1 is a side view of the backpack cart in use in the tilted position.

Referring now to FIG. 1 we see a perspective view of the backpack cart 100 being pulled by a person via handle 20. The backpack cart 100 has two wheels 6, 8 that are relatively large in diameter to help the cart navigate rough terrain. In the preferred embodiment, the wheels 6, 8 are pneumatic and are approximately sixteen inches in diameter. A standard backpack 2 can be held on the cart of the present backpack cart 100 via strap upper and lower strap holding members 14, 16 and a bottom support plate 22 that are all supported by central pole 10. A lower support post 4 allows the backpack cart 100 to stand upright without the user's help.

Figure 2:
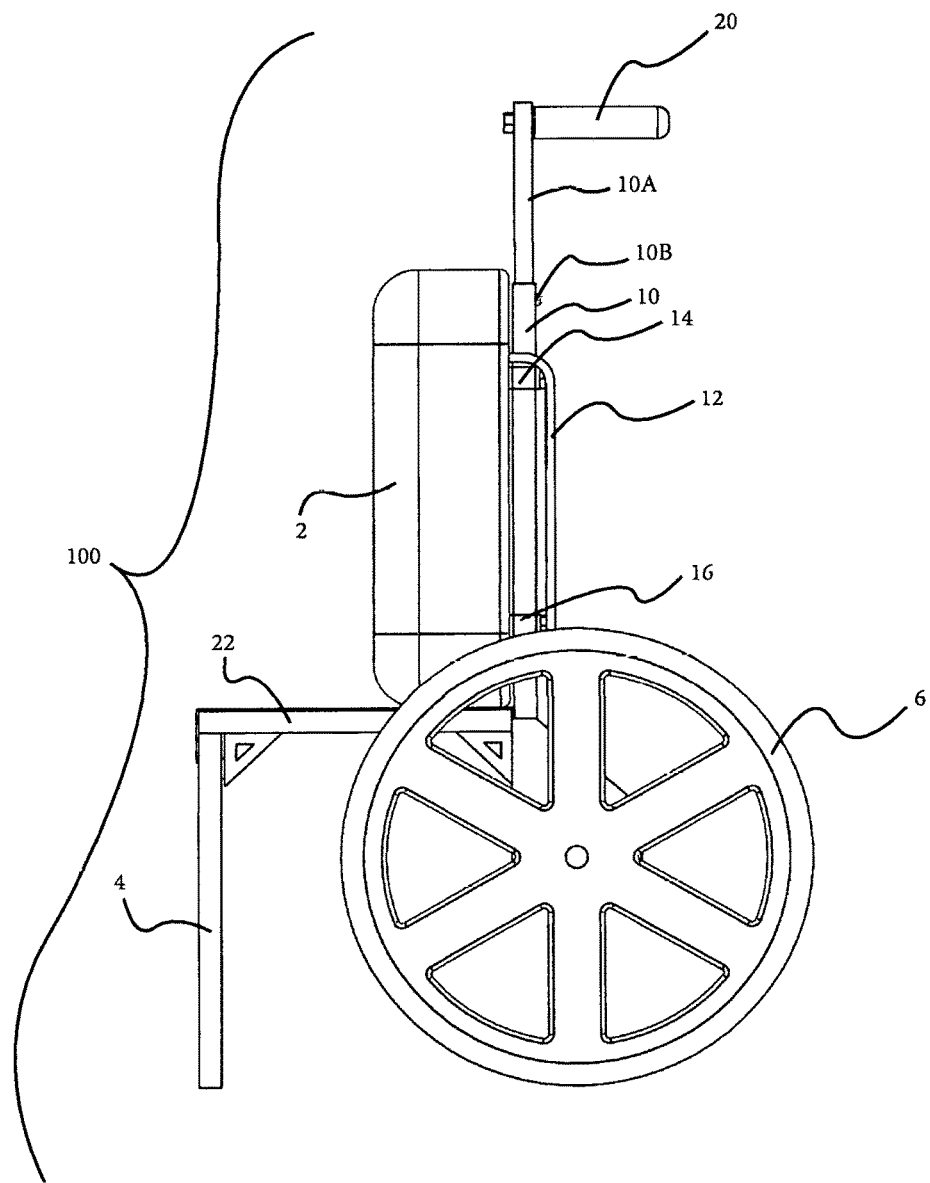
FIG. 2 is a side view of the backpack cart.
Figure 3:
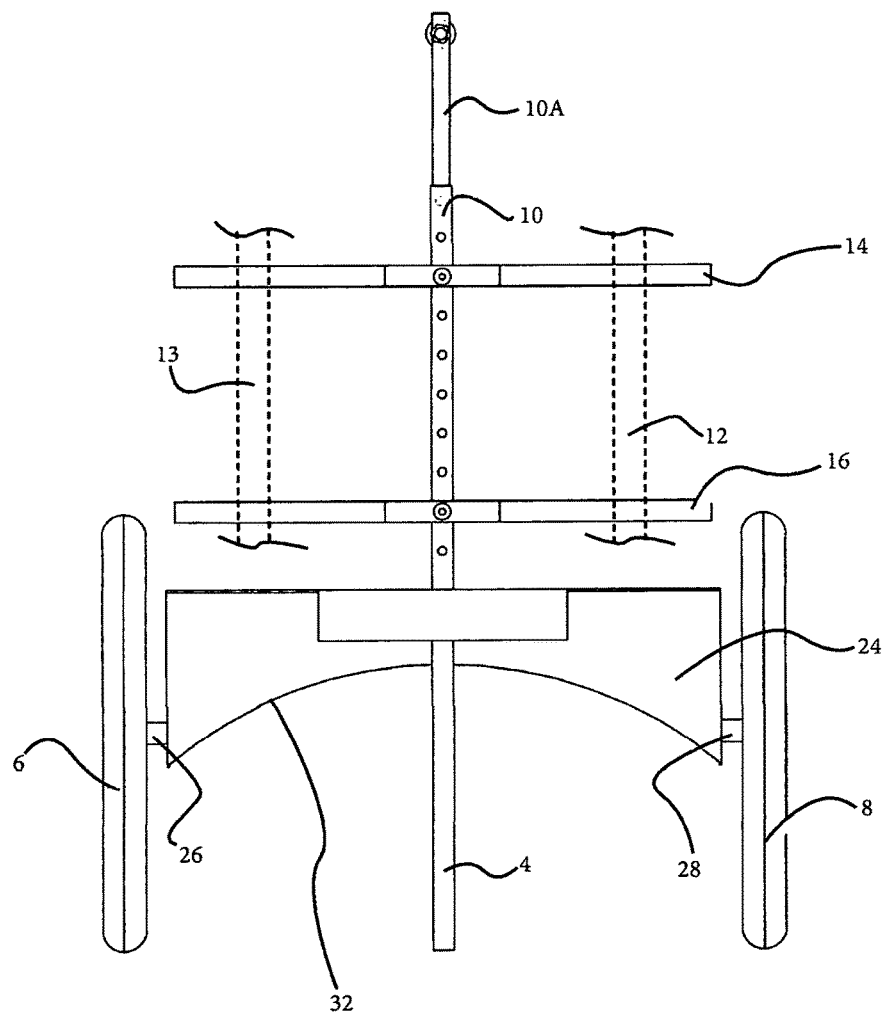
FIG. 3 is a rear view of the backpack cart.

FIG. 2 is a side view of the backpack cart 100, upper strap retaining member 14 and lower strap retaining member 16 are seen in end view, retaining backpack straps 12, 13 also seen in dotted lines in FIG. 3. Central post 10 is adjustable in height via slide member 10A and locking knob 10B.

FIG. 3 is a rear view of the backpack cart 100. Wheel attachment plate 24 is approximately rectilinear in shape and includes a concave cutout portion at the lower edge of the plate. The shaft members 26, 28 are attached to the lower right and left ends of the plate 24. This configuration creates a generous space under the backpack support plate 22. This, along with the large sixteen-inch diameter wheels 6, 8, and the concavity 32 in support plate 24, allow the backpack cart 100 to roll over very rugged and rocky terrain which is very helpful when hiking along rugged trails.

Figure 4:
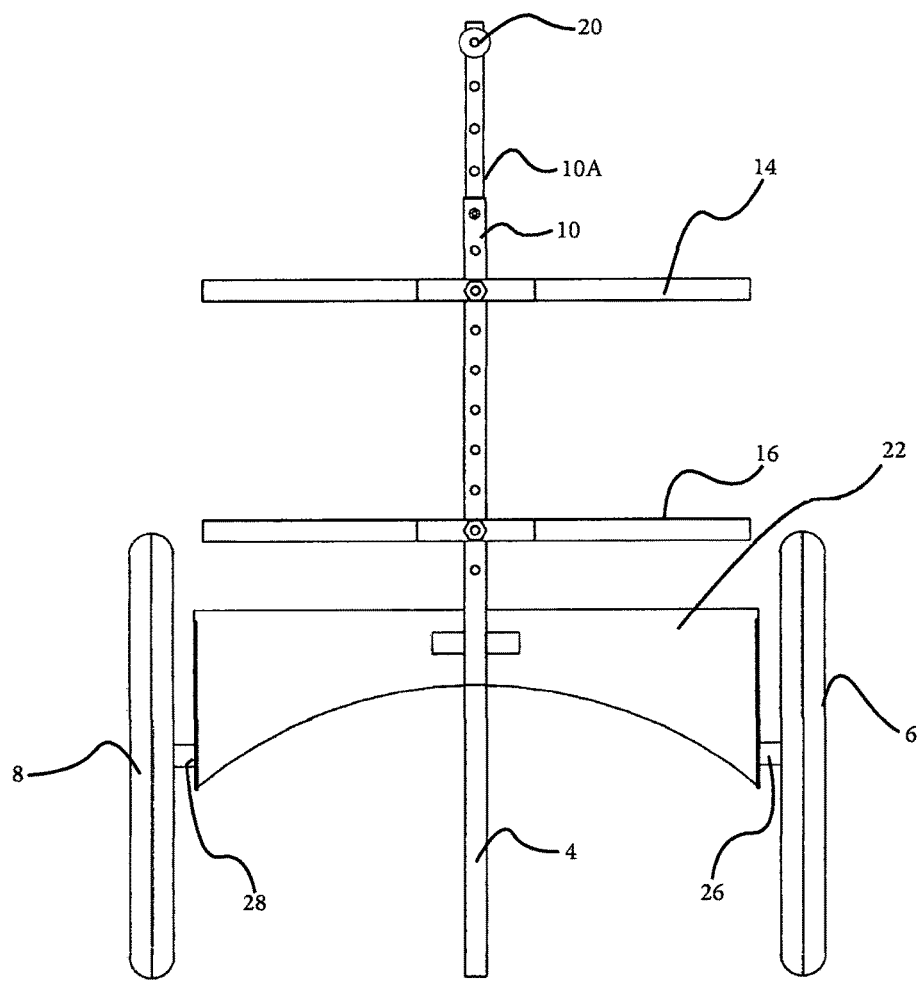
FIG. 4 is a front view of the backpack cart.

FIG. 4 is a rear view of the backpack cart 100. Lower support post 4 allows the entire backpack cart 100 to remain upright while unattended.

Figure 5:
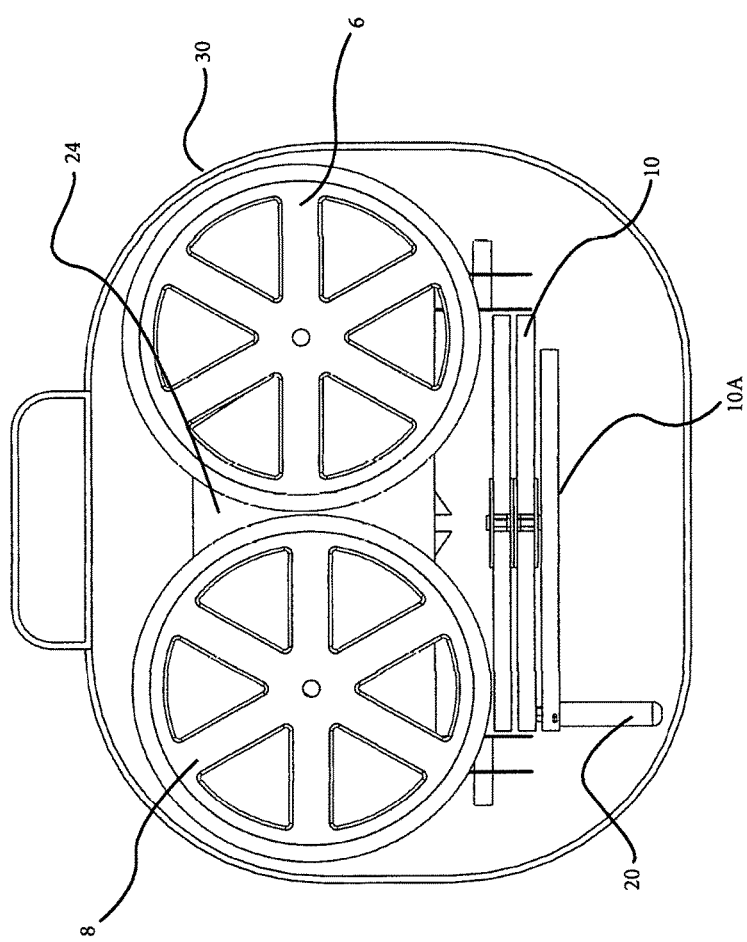
FIG. 5 is a plan view of the backpack cart with all parts disassembled and stored in a carry bag.

FIG. 5 is a plan view of all the components 6, 8, 10, 10A, 14, 16, 24 in a disassembled flat state that can be compactly stored in a carry bag 30 or backpack.

Figure 6:
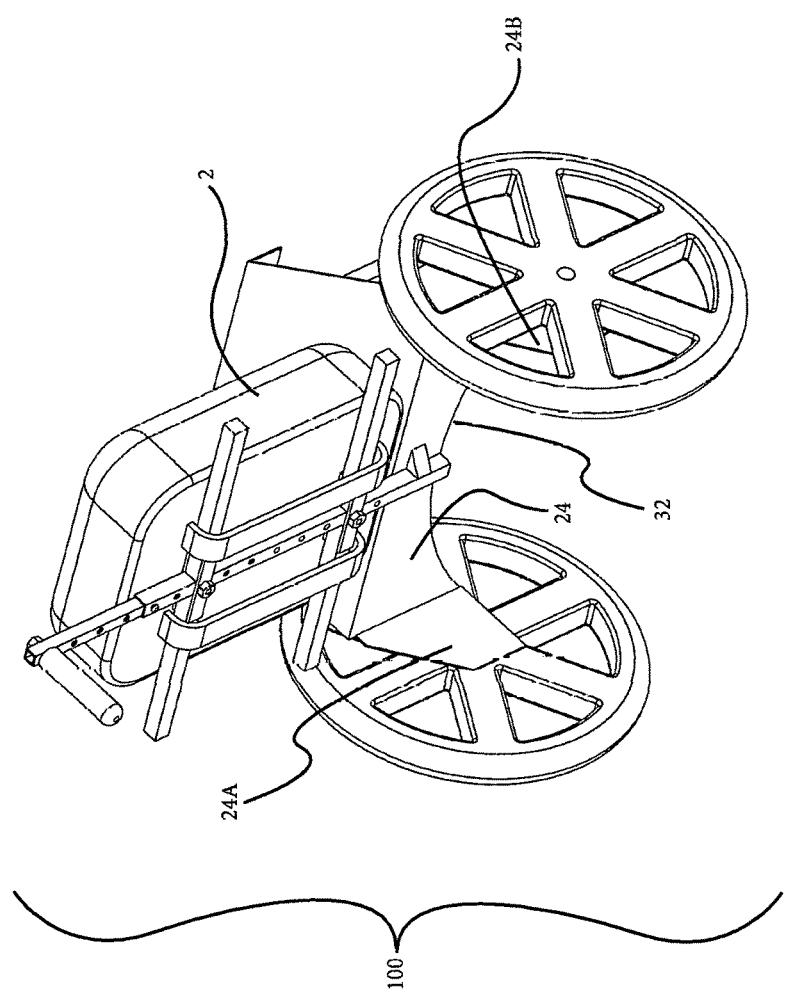
FIG. 6 is a perspective view of the backpack cart in the use position.

FIG. 6 is a perspective view of the backpack cart 100 in the use position. This view is shown for clarity purposes. Right-angled members 24A, 246 extend rearwardly from support plate 24. Wheel shafts 26, 28 extend outwardly from the lower portion of each right-angle member. Concavity 32 is clearly shown and helps the backpack cart 100 to clear larger objects such as rocks and small boulders.

While the backpack cart has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Backpack cart comprising:
   a pair of wheels;
   a central post;
   a horizontal support member;
   a lower strap holding member;
   an upper strap holding member;
   a handle member;
   a pack support plate;
   a lower support post;
   a wheel retaining shaft is attached to each lower edge of the horizontal support member;
   said wheels each attached to said wheel retaining shafts;
   said central post attached centrally to said horizontal support member;
   said pack support plate attached perpendicularly to the upper edge of said horizontal support holder;
   said lower strap holding member centrally and perpendicularly attached to the lower portion of said central post;
   said upper strap holding member centrally and perpendicularly attached to the upper portion of said central post;
   said handle member perpendicularly attached to the top of said central post facing in the opposite direction of said pack support plate;
   said lower support post centrally and perpendicularly attached to the edge of said pack support plate and in a downward orientation allowing its lower tip to touch the ground when the backpack cart is in a rest position; and
   said upper and lower strap holding members capable of retaining the straps of a standard backpack and said pack support plate capable of supporting the weight of a backpack enabling a user to guide said backpack cart in a rolling manner.

2. A backpack cart as claimed in claim 1 wherein said upper and lower strap holding members are capable of being positioned at various heights on said central post thereby enabling them to be ideally adjusted for large or small backpacks, further comprising means to position the upper strap holding member and the lower strap holding member at various heights on said central post enabling the said backpack cart to accommodate backpacks of various sizes.

3. A backpack cart as claimed in claim 1 wherein said horizontal support member is approximately rectilinear; where said wheel shafts extend from the lower left and right side of said support member and where the lowest edge of said horizontal support member is concave in shape providing means to roll the said backpack cart over a terrain with vertical unevenness as large as approximately the distance between the bottom of the backpack cart wheels and the top point of the concavity.

4. A backpack cart as claimed in claim 1 wherein said wheels are approximately sixteen inches in diameter and include pneumatic tires.

5. A backpack cart as claimed in claim 1 wherein said central pole is a tube of approximately square cross-section wherein the backpack cart further comprises an inner pole that is also a tube of approximately square cross section, said inner pole slidably inserted in the central pole and a locking knob providing means to secure the inner slidable pole in any position along the length of the central pole wherein the central pole with the inserted inner pole securable in different positions within the central pole provide means to accommodate people of varying heights.

6. A backpack cart as claimed in claim 1 comprising means to be assembled and disassembled without tools.

7. A backpack cart as claimed in claim 6 wherein the disassembled backpack cart can be stored within a portion of a backpack that is designed to hold said components.

* * * * *